Patented May 24, 1938

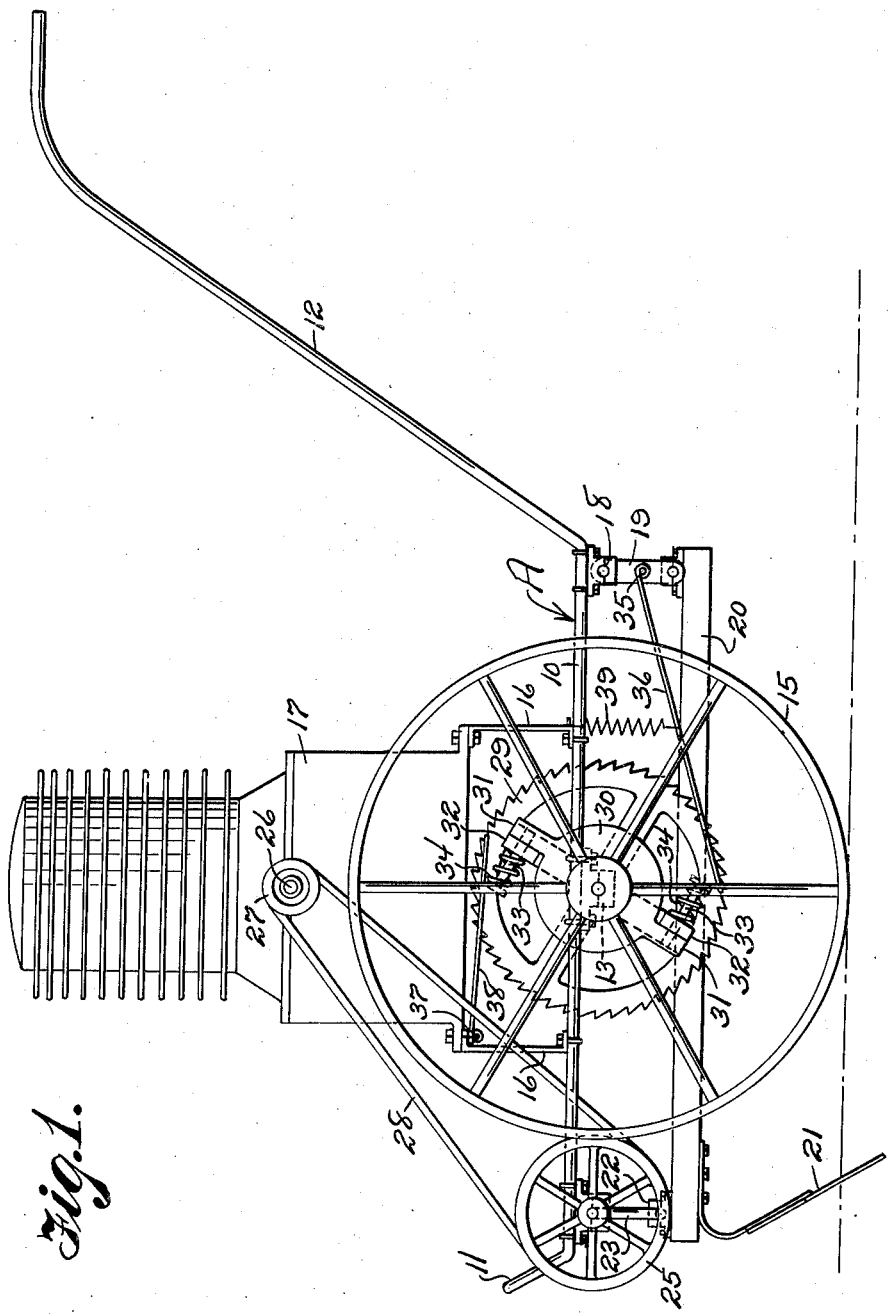

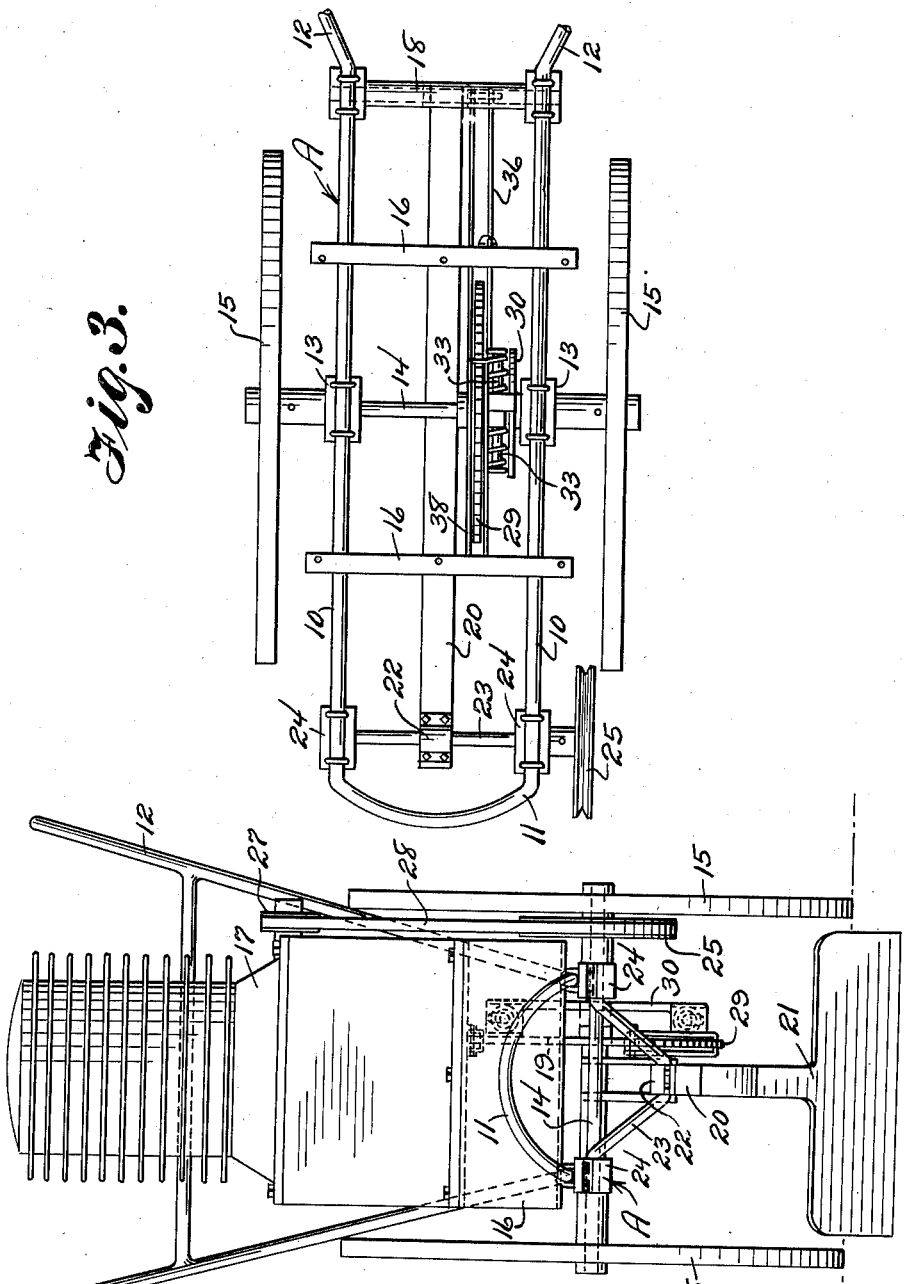

2,118,649

UNITED STATES PATENT OFFICE 2,118,649

POWER-DRIVEN HOE

Juel E. Kopperud, Hartland, Minn.

Application June 8, 1937, Serial No. 147,094

4 Claims. (Cl. 97—36)

The invention relates to a gardening hoe and more especially to a power driven hoe.

The primary object of the invention is the provision of a hoe of this character, wherein the hoe blade is mechanically operated and under high speed action will cut into the ground once for every inch of traction causing any hard packed soil, grass, weeds or roots to be pulverized, leaving a well mulched soil, destroying plant growth and assuring proper cultivation to the soil.

Another object of the invention is the provision of a hoe of this character, wherein the depth of cut can be regulated at the will of the operator and such hoe can be properly guided in that it is ahead of the drive wheels and susceptible of operation close to a growing plant while the operating action of the hoe enables a comparatively small amount of ground to be moved at a time and will not damage the plant as such hoe operates between the rows instead of straddling such rows.

A further object of the invention is the provision of a hoe of this character, wherein the same is of novel construction and is readily and conveniently handled while the hoeing operation is carried forth mechanically.

A still further object of the invention is the provision of a hoe of this character, which is simple in construction, light in weight yet strong, durable, thoroughly reliable and efficient in operation, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation of a hoe constructed in accordance with the invention.

Figure 2 is an end elevation.

Figure 3 is a top plan view with the motor removed.

Similar reference characters indicate corresponding parts throughout the several views in the drawings.

Referring to the drawings in detail, the hoe comprises a body frame A preferably formed from piping 10 having a looped angularly disposed front closed end 11 and guide handle bars 12 at the rear end, respectively. The frame A is equipped with bearings 13 for an axle shaft 14 having journaled thereon traction wheels 15, these being disposed outside of and beyond opposite sides of said frame. Rising from the frame and rigidly fixed thereto are standards 16 forming a rack for an internal combustion engine 17 of the single cylinder type.

On the frame A next to the handles 12 is a cross journal 18 to which is swingingly connected a hanger 19 for horizontal oscillatory movement and pivoted to this hanger at the center line of draft of the implement is a pitman 20 which extends forwardly and at its front end carries a rearwardly inclined hoe blade 21, it being of a width substantially the width between the traction wheels 15.

The pitman 20 at the end carrying the blade 21 has a bearing 22 connected with the crank 23 of a crank shaft which is journaled in bearings 24 fitted to the forward end of the frame A. The crank shaft has fixed thereto a belt pulley 25 while the drive shaft 26 of the motor 17 has fixed thereto a belt pulley 27 and over these pulleys is trained an endless driving belt 28 so that the motor will constitute the power for the operation of the hoe blade 21.

Loose on the axle shaft 14 is a ratchet wheel 29 while fixed to said axle shaft 14 is a disk 30, it having at diametrically opposite points peripheral ears 31 which confront companion ears 32 on the ratchet gear 29, the ears 31 being fitted with studs 33 which play loosely through the ears 32 and have carried thereby and coiled about the same the tensioning springs 34.

Pivoted at 35 to the hanger 19 is a ratchet feed pawl 36 which is adapted to engage the gear 29 and thus advance the implement while pivoted at 37 is a latching action ratchet pawl 38 which also engages with the gear 29 to hold the implement against backward movement when being advanced in the operation of the motor 17.

The implement is motor driven for the advancement thereof, the hoe blade 21 being operated at a high rate of speed for cutting into the ground once for every inch of traction of the implement, causing any hard baked soil, grass, weeds or roots to be pulverized leaving a well mulched soil and the depth of cutting action of such hoe blade can be regulated by raising or lowering the implement at its rear end through the instrumentality of the handle bars 12, the implement being perfectly guided due to the fact that the hoe is placed ahead of the drive wheels 15, the operation of the hoe blade 21 for the cultivation of the soil being obvious from Figures 1 and 2 of the drawings.

The lower ratchet pawl 36 is held in working relation to the gear 29 by the spring 39 connected to the said pawl and the frame of the implement. The pawl 38 is maintained in working relation to the gear 29 by gravity although if necessary it may be otherwise held in its working position.

What is claimed is:

1. An implement of the character described comprising a frame, a hoe bar pivotally hung from said frame for reciprocatory and oscillatory movements, means on the frame and connected with the bar to effect movements thereof, a power unit on said frame and driving the last-named means, a hoe blade carried by said bar forwardly of the point of traction and of a width substantially the width between such traction, and means for locking against backward traction.

2. An implement of the character described comprising a frame, a hoe bar pivotally hung from said frame for reciprocatory and oscillatory movements, means on the frame and connected with the bar to effect movements thereof, a power unit on said frame and driving the last-named means, a hoe blade carried by said bar forwardly of the point of traction and of a width substantially the width between such traction, and means for locking against backward traction, and including yieldable means active on initial backward traction movement.

3. An implement of the character described comprising a frame, an axle supported by the frame, wheels journaled on the axle and outside of said frame, a hanger swingingly carried aft of the frame, a pitman pivoted to said hanger, a crank shaft journaled fore of said frame and connected with the forward end of the pitman, a hoe blade depending from the forward end of said pitman, a ratchet wheel loose on said axle, a disk fixed to the axle, a yieldable connection between the disk and said ratchet wheel and active only on backward traction, ratchet pawls coacting with the ratchet gear for locking therewith on backward traction, and means on the frame for operating the pitman for imparting a reciprocatory and rotary movement to the forward end thereof.

4. An implement of the character described comprising a frame, an axle supported by the frame, wheels journaled on the axle and outside of said frame, a hanger swingingly carried aft of the frame, a pitman pivoted to said hanger, a crank shaft journaled fore of said frame and connected with the forward end of the pitman, a hoe blade depending from the forward end of said pitman, a ratchet wheel loose on said axle, a disk fixed to the axle, a yieldable connection between the disk and said ratchet wheel and active only on backward traction, ratchet pawls coacting with the ratchet gear for locking therewith on backward traction, means on the frame for operating the pitman for imparting a reciprocatory and rotary movement to the forward end thereof, and hand holds on the rear end of the frame.

JUEL E. KOPPERUD.